Patented Mar. 3, 1925.

1,528,370

UNITED STATES PATENT OFFICE.

CHRISTIAN J. GAMBEL, OF NEW ORLEANS, LOUISIANA, ASSIGNOR TO CARBROX COMPANY, OF NEW ORLEANS, LOUISIANA, A CORPORATION OF LOUISIANA.

DECOLORIZING COMPOSITION AND PROCESS OF PRODUCING THE SAME.

No Drawing.   Application filed July 17, 1920.   Serial No. 397,083.

*To all whom it may concern:*

Be it known that I, CHRISTIAN J. GAMBEL, a citizen of the United States, residing at New Orleans, in the parish of Orleans and State of Louisiana, have invented certain new and useful Improvements in Decolorizing Compositions and Processes of Producing the Same; and I do hereby declare the following to be a full, clear, and exact description of the invention, such as will enable others skilled in the art to which it appertains to make and use the same.

This invention relates to a new filtering and decolorizing medium for sugar solutions, and to processes of producing and operating the same, and has for its object to provide an article which will be comparatively less costly to produce and methods which will be less costly to carry out, and more efficient in action than those heretofore proposed.

With these and other objects in view the invention consists in the novel composition of matter constituting the filtering and decolorizing medium, and in the novel steps and combinations of steps constituting the processes, all as will be more fully hereinafter disclosed and particularly pointed out in the claims.

In order that the exact invention may be the more clearly understood, it is said: It is well known to those skilled in the art that it is at present customary in manufacturing sugar, to use diatomaceous or infusorial earths such as kieselguhr and other filtering materials.

The function of said filtering mediums is to take out colloidal and foreign matters in the sugar solutions, and thus to break down their viscosities, so that said solutions will not only have a very large portion of their foreign matter removed by such materials, but they also will be more liquid, or will later flow more freely through the decolorizing carbon materials such as bone black, norit, etc., which are commonly used to remove the coloring material from the filtered solutions.

That is to say, it is further well known that after the sugar solutions have been thus passed through the filter mediums they come through in a colored condition so that it is not possible to make white sugar therefrom without further treatment. Accordingly, it is customary at present to pass said filtered solutions through what is known as decolorizing mediums which are generally composed of bone black, which at present is worth about $250 per ton, and it requires substantially a ton of bone black to treat a ton of sugar.

In addition to the use of bone black, it is well known when norit is obtainable, which is a carbonaceous material, the composition and preparation of which is a secret, that its use is some fifteen times as efficient as is bone black, but it is very difficult to get it at all, and its cost has been for some time about $500 per ton.

It is further well known to those skilled in the art that Herbert M. Shilstone has produced a decolorizing material composed of carbonized fibrous rice material which is disclosed in his copending U. S. application #172,123, filed May 31, 1917, and entitled Decolorizing carbons and process of producing the same. This said Shilstone material is produced by charring fibrous rice material, boiling the same in caustic soda until a substantial proportion of the silica present has been removed, bringing the material to a neutral condition as by washing in acidulated water, drying and finely dividing the same when it is ready for use as a decolorizer all as is well known to those skilled in this art.

This said carbonized fibrous rice decolorizing material has been proved to have an efficiency equal to that of norit, and in some cases even a higher decolorizing efficiency than norit. The above mentioned three decolorizing materials are about all that have any commercial significance today in the sugar industry.

Sugar chemists are not agreed on the physical reasons for the actions of these decolorizing materials, but if the size of their pores have anything to do with it, it seems obvious that since the filtering and decolorizing pores of these several materials are very small, an increase in the fluidity or the liquidity of the sugar solutions would naturally cause them to flow much faster through the very fine, or what we might call the microscopic pores of the decolorizing material than would be the cause if the fluidity remains what it is after merely passing said solutions through a filter medium such as kieselguhr for example.

Whatever may be the true physical action,

I have discovered if one mixes a decolorizing material, such as those mentioned above, with a filtering material, as by finely subdividing both materials, and making a filtering and decolorizing mixture thereof, that not only will the fluidity of the sugar solutions treated be greatly increased over what would be the sum of the independent actions of each, but the decolorizing power of such a mixture will also be very much greater than will be the combined decolorizing powers of the two materials acting separately.

In order to make this action clear, an example is given as follows:—I may take five parts by weight of a decolorizing material, such for example, as that disclosed by Shilstone in his said copending application above mentioned, and pass through it for a period of say ten minutes 100 parts by weight of a given sugar solution. At the end of the ten minutes the sugar solution will be decolorized to a degree which would be called 100% by sugar experts, or it will be decolorized to such an extent that perfect white sugar could be made therefrom.

Now, let us take this same raw sugar solution, and this same Shilstone carbon and mix with the carbon say 20% or more of filtering material such as kieselguhr, the two being very finely subdivided and thoroughly mixed. Let us now pass the 100 parts of the sugar solution through the six parts of the mixed filtering and decolorizing material produced as above.

We will find that the same degree of decolorization will take place in say from 3 to 5 minutes. We will also find that if we pass this same sugar solution first through the said filtering material composed or consisting of one part of kieselguhr and then immediately through the five parts of the Shilstone carbon the same amount of decolorization would require if not 10 minutes, very nearly that period of time.

In other words, by the simple expedient of mixing the two filtering and decolorizing materials together, the time of decolorizing has been reduced to a period of from anywhere between 25% and 50% of the time required when no mixture is used. Not only is the time of producing a given degree of decolorization thus very greatly reduced, which in itself is of very great commercial importance in the sugar industry but if we wish to take the normal time of decolorizing to 100° efficiency of say 10 minutes, we can by pursuing the method above outlined use less decolorizing carbon in the mixture, and thus very greatly save in the cost of the decolorizing carbon used. Stated in other language, suppose we are using norit at a cost of $500 a ton, we can very greatly reduce the amount of this norit necessary to decolorize a ton of sugar in the normal time now required, by finely dividing said norit and mixing it with finely divided kieselguhr for example.

The amount of kieselguhr that should be mixed with the norit or with the Shilstone carbon or with the bone black would depend entirely upon the nature of the sugar solution. I have found that with certain solutions, such for example, as raw sugar solutions, from 20% to say 30% or 35% of diatomaceous or infusorial earth should be mixed with the decolorizing material, while if we use molasses solutions this filtering material can be increased up to say 50% or 60% of the weight of the decolorizing material.

I am unable to offer a satisfactory scientific explanation of the above mentioned surprising results but a plausable explanation to me consists in the following:— Different filtering materials naturally should have a selective action on the colloid material and impurities in the original saccharine solutions.

It is very possible that kieselguhr will select out certain colloids and impurities in sugar solutions, while the Shilstone carbon, the norit and the bone black decolorizing materials will select out other colloids, and impurities, so that the two together would form a combination having a maximum efficiency in rendering the solution abnormally fluid or liquid. That is to say, if we consider a finely divided mixture of kieselguhr and carbon, a given portion of the fluid may be considered to first pass through the kieselguhr and then to pass through the carbon, whereupon its viscosity will be very greatly reduced. Now, this same portion of fluid will, during the filtering process with my mixture be repeatedly passed through other portions of carbon, and it being more fluid than it would have been had it not encountered carbon in the first instance, it will be decolorized much quicker and with much more efficiency than would be the case if no mixture of kieselguhr and carbon had been prepared in the first place.

This increase of fluidity has another valuable function in the subsequent treatment of the sugar solution. That is to say, it is well known to those skilled in the art that the more fluid is the decolorized solution, the larger will be the yield of sugar in what is known as the second boiling operation. This said second boiling operation, as is further well known, consists in evaporating the solution to the point of crystallization of the sugar remaining in the liquor coming from the first boiling, and therefore, my mixture enables the operator to obtain a larger yield and a better quality from the same ton of raw sugar.

Another important advantage of this invention will be readily understood from the following:—

After the kieselguhr or other filtering material has been used a number of times, its pores get stopped up, and the same is true, of course, of the decolorizing material whatever it may be.

Accordingly, it is necessary in both cases to revivify said materials. In the case of decolorizing materials, an efficient method of revivifying consists in heating them out of contact with the air, for a period of say from 10 minutes to 2 hours at a temperature of from say 800° F. to 1100° F. This heating has the effect of driving off the volatile matter which has been entrained or caught from the sugar solutions, and of carbonizing the carbonaceous constituents of said materials, without burning up the original carbon.

As regards the filtering material, it has been heretofore customary to throw it away when it got clogged up. In operating this invention, on the other hand, I may for example take the above mentioned 5 parts by weight of decolorizing material, mix it with say 1 or more parts by weight of filtering material, use it as above mentioned, and when said mixture of materials has been clogged up by the carbonaceous, or other materials from the sugar juices, I may subject the said mixture to the above mentioned temperatures for a suitable period stated, whereupon I will actually increase the amount of decolorizing carbon present.

That is to say, instead of having at the end of the revivifying process 5 parts by weight of decolorizing carbon, I will have say 6 parts by weight, or higher of said carbon. I may then subject this six parts of decolorizing carbon to the action of sugar juices, whereupon I will find that it will decolorize said juices about as efficiently as would 6 parts by weight of the original decolorizing carbon had it been used.

In other words, I have really by the process described manufactured from the materials carried by the sugar juices a considerable percentage of decolorizing carbon which when left mixed with a filtering material present will have the same surprising efficiency as the original mixture. By repeating the revivifying process I still further increase the weight of the decolorizing mixture, and thereby lessen the amount of the original decolorizing carbon that would otherwise be necessary to use. Stated in other language, by following the process above pointed out, I can actually very materially reduce the cost of the original decolorizing carbon in a sugar factory because I make it go very much further than would be otherwise possible, while at the same time I greatly reduce the time required in the decolorizing of the original juices and also very greatly increase the yields of white sugar. It is needless to say that each of these results are of supreme importance in the sugar industry from a commercial standpoint.

In addition to the above advantages derived from this invention, I would further point out that the process of forming filter cakes in a standard type of filtering apparatus such as a filter press or a plate pressure filter, the carbons or decolorizing materials have a sufficiently high specific gravity to render the formation of a uniform cake very difficult. The action taking place being the settling of the decolorizing material to the lower portions of the filter cell, or on the lower portions of the filter plates, and the formation of only thin deposits on the upper areas.

By the use of the filtering and decolorizing mixture above described, which consists of a porous filtering material associated with a decolorizing material, the action of the filtering process produces a uniform cake due to an apparent uniform suspension of the filtering solids contained in the liquid.

Through the formation of this uniform filtering surface, it is possible to apply wash waters as well as steam or air to the cake and by this treatment one may recover sugars and other valuable constituents from the cake, a result which is not easy of attainment when the filter cake is not of a uniform thickness.

A further important feature of this invention resides in the fact that by using the filtering and decolorizing mixture above disclosed, a sugar manufacturer need only employ a single operation to accomplish the filtering and the decolorizing steps necessary in making white sugar, a result which has never been commercially attained heretofore, in so far as I know.

A convenient way of using this filtering and decolorizing mixture is to add it in a finely divided condition directly to the sugar solutions, and then pass the said solutions in a hot condition through a suitable fabric material, whereupon the said solutions will be found on one side of the fabric in a decolorized condition while the mixed decolorizing material will be found in a cake substantially uniform in thickness on the applied side of said fabric.

It is obvious that those skilled in the art may vary the details of the composition of matter as well as the details of the various procedures above outlined, without departing from the spirit of the invention, and therefore, I do not wish to be limited to the above disclosure except as may be required by the claims.

What I claim is:—

1. The herein described new composition of matter consisting of a finely divided filtering material containing kieselguhr mixed with a separate and finely divided decolorizing material containing a vegetable carbon, substantially as described.

2. The herein described new composition of matter consisting of a finely divided filtering material mixed with a finely divided decolorizing material containing a carbonized fibrous rice material, substantially as described.

3. The process of making a filtering and decolorizing material for saccharine solutions which consists in mixing in a finely divided condition a material capable of filtering, saccharine solutions with carbonized fibrous rice material also in a finely divided condition, substantially as described.

4. The process of increasing the yield of white sugar from sucrose solutions which consists in lowering the viscosity of said solutions by subjecting them to the simultaneous action of a mixture of finely divided filtering and finely divided decolorizing materials containing carbonized fibrous rice material; and crystallizing out the sugar present, substantially as described.

5. As a new article of manufacture the herein described new filtering and decolorizing material consisting of a mixture of finely divided filtering and finely divided decolorizing materials to which has been added finely divided carbonaceous material.

In testimony whereof I affix my signature.

CHRISTIAN J. GAMBEL.